(12) United States Patent
Reiland et al.

(10) Patent No.: US 8,034,240 B2
(45) Date of Patent: Oct. 11, 2011

(54) COALESCING ELEMENT

(75) Inventors: Cheryl M. Reiland, Turlock, CA (US);
Walter H. Stone, Modesto, CA (US)

(73) Assignee: Parker-Hannifin Corporation,
Cleveland, OH (US)

( * ) Notice: Subject to any disclaimer, the term of this patent is extended or adjusted under 35 U.S.C. 154(b) by 342 days.

(21) Appl. No.: 12/478,799

(22) Filed: Jun. 5, 2009

(65) Prior Publication Data
US 2010/0219117 A1    Sep. 2, 2010

Related U.S. Application Data

(60) Provisional application No. 61/156,629, filed on Mar. 2, 2009.

(51) Int. Cl.
*B01D 27/14* (2006.01)

(52) U.S. Cl. ........ 210/299; 210/315; 210/338; 210/444; 210/450; 210/454; 210/493.2; 210/DIG. 5

(58) Field of Classification Search ................... 210/299, 210/315, 337, 338, 440, 443, 444, 450, 454, 210/488, 493.2, DIG. 5
See application file for complete search history.

(56) References Cited

U.S. PATENT DOCUMENTS

| | | |
|---|---|---|
| 1,746,336 A | 2/1930 | Breer |
| 3,040,894 A | 6/1962 | Pall |
| 3,187,895 A | 6/1965 | Pall et al. |
| 3,262,564 A * | 7/1966 | Silverwater et al. .......... 210/315 |
| 3,420,377 A * | 1/1969 | Vandersip ..................... 210/315 |
| 3,467,256 A * | 9/1969 | Humbert, Jr. et al. ........ 210/338 |
| 3,529,727 A | 9/1970 | Bernhard |
| 3,954,624 A | 5/1976 | Petrucci |
| 4,077,876 A | 3/1978 | Southall |
| 4,303,514 A | 12/1981 | Theorell |
| 4,437,986 A | 3/1984 | Hutchins et al. |
| 4,522,712 A | 6/1985 | Fischer et al. |
| 4,529,514 A | 7/1985 | Gruett |
| 4,529,515 A | 7/1985 | Selz |

(Continued)

FOREIGN PATENT DOCUMENTS
EP    0 250 861 A2    7/1988

OTHER PUBLICATIONS

Four pages of drawings of Baldwin Filters Identified as "Baldwin BF7827D".

(Continued)

*Primary Examiner* — Christopher Upton
(74) *Attorney, Agent, or Firm* — Christoper H. Hunter (57) ABSTRACT

A filter element includes a cylindrical housing enclosing a ring-shaped filter media assembly. The media assembly includes inner and outer media rings, moveably supported relative to one another, to remove particulate matter and water from a fluid stream. The outer ring surrounds the inner ring and is sealed by a first seal to the housing. An end cap assembly at the upper end of the element includes an annular end cap piece attached to an upper end of the inner ring, a flat plate, and a threaded flange portion bounding the periphery of the plate. A second seal is provided between the upper end cap of the inner ring, and an upper end cap of the outer ring. The housing is secured to the media assembly by forming an open end of the housing around the flange portion.

14 Claims, 8 Drawing Sheets

U.S. PATENT DOCUMENTS

| | | | |
|---|---|---|---|
| 5,049,269 A | | 9/1991 | Shah |
| 5,078,877 A | * | 1/1992 | Cudaback et al. ............ 210/444 |
| 5,084,170 A | | 1/1992 | Janik et al. |
| 5,342,511 A | * | 8/1994 | Brown et al. ................. 210/450 |
| 5,350,506 A | | 9/1994 | Dye et al. |
| 5,362,390 A | | 11/1994 | Dombek et al. |
| 5,456,830 A | | 10/1995 | Widenhoefer et al. |
| 5,520,801 A | * | 5/1996 | Gerber et al. ................. 210/450 |
| 5,643,446 A | | 7/1997 | Stanford et al. |
| 5,674,393 A | * | 10/1997 | Terhune et al. ............... 210/315 |
| 5,855,780 A | | 1/1999 | Clausen et al. |
| 6,113,781 A | | 9/2000 | Popoff et al. |
| 6,328,883 B1 | | 12/2001 | Jensen |
| 2002/0134725 A1 | * | 9/2002 | Smith et al. ................... 210/338 |
| 2004/0154975 A1 | * | 8/2004 | Girondi ......................... 210/450 |
| 2007/0289915 A1 | * | 12/2007 | Jiang et al. .................... 210/338 |

OTHER PUBLICATIONS

One page of drawing of Baldwin Filters identified as "Baldwin BF7827C".

Four pages of drawings of Champion Filters identified as "Champion LFF8736B".

Parker Hannifin, Racor Division, DMax Filter, DCM (Depth Coalescing Element), consisting of two pages showing Concept #1 and Concept #2, respectively.

* cited by examiner

COALESCING ELEMENT

CROSS-REFERENCE TO RELATED CASES

The present application claims the benefit of the filing date of U.S. Provisional Application Ser. No. 61/156,629; filed Mar. 2, 2009, the disclosure of which is expressly incorporated herein by reference.

FIELD OF THE INVENTION

This invention relates to fluid filters, and more particularly to fuel filters for vehicles.

BACKGROUND OF THE INVENTION

Many types of fuel filters (also known as "separators") are known in the art. A popular type of filter construction is a type that has a filter head to which a replaceable "spin-on" element is attached. The head is a permanent part of the fuel system of the vehicle and includes inlet and outlet connections to the fuel lines. The filter element includes threads on an upper tap plate or cap which cooperate with threads on the underside of the head and allow the element to be spun onto the filter head. The element can be easily removed from the filter head and a new element attached without removing the filter head from the fuel line connections.

One issue with filter elements is that elements with different efficiencies, applications, and/or qualities can sometimes fit on the same filter head. Periodic replacement of the element is necessary such that the filter element will not become so loaded with impurities that fuel flow is restricted. Replacing the element also ensures that impurities are removed from the fuel before it is delivered to downstream components such as fuel injection pumps and fuel injectors, where such contaminants may cause damage. It is important to replace a spent element with the same type of element or one that at least meets the same filtration specifications. It is also important to run the filter with an element installed. Using the wrong type of element or failing to use any element can allow damage to occur to the downstream engine components. Certain elements have been designed whereby the element can only fit a certain filter head, and where the filter will not operate without such a filter element installed, such as shown and described in Clausen, U.S. Pat. No. 5,643,446. In the Clausen patent, a projection supported at one end of the element is configured to engage a valve in the filter head—thereby opening a fuel flow path through the element and head when the filter element is properly installed.

Jensen, U.S. Pat. No. 6,328,883 similarly shows a projection configured to actuate a valve in the filter head; and in addition, among other things, shows and describes a series of holes formed radially through a flange portion of the upper end cap to direct fuel flow into the element. In both Clausen and Jensen the media assembly is assembled through the open end of a cup-shaped canister, and the open end is then formed, such as by roll-forming, over an upper end cap to secure the media components within the housing.

The Clausen and Jensen elements are each relatively simple and straightforward to manufacture and assemble, and address some of the issues identified above; namely, attaching an appropriate filter element to a filter head. Nevertheless these elements provide only a single type of media to remove particles from the fluid stream passing through the element. With more advanced system requirements, it is desirable that such elements also remove all or substantially all of the water in the fuel as the fuel passes through the filter element. Water can adversely effect fuel injectors and other critical downstream components in the engine, and thereby degrade performance.

It is of course known to provide hydrophobic (water-separating) media in filter elements to separate water from a fluid stream; however it is believed such elements have basically just incorporated a single or multi-layered structure into a ring shape, and attached conventional single-piece annular or circular end caps at either end of the media ring. The water collecting on the outside surface of the element drips down into a lower collection chamber or bowl where it is periodically removed.

A more efficient (effective) structure is also know using concentric media rings, with an outer particle-separating media surrounding an inner hydrophobic media, and an annular gap provided therebetween. Water collects on the surfaces of the media rings and can drain down into the lower collection chamber or bowl. The outer media can be optimized for its particle separation capabilities, while the inner media can be optimized for its water separating capabilities. Nevertheless, again it is believed such design has used a single-piece upper end cap -with both media rings being adhesively bonded to the inner/lower surface of such end cap. While this may minimize the part-count of the media assembly, the rigid multi-ring media structure can be misaligned or cock within the housing during manufacture and/or assembly, and otherwise not sit properly in the housing when the open end of the housing is formed over the upper end cap of the media assembly. A misaligned upper end cap can allow leakage from the housing, and also prevent proper sealing between the element and filter head.

It can also be complicated and difficult to properly attach both the inner and outer media rings to the underside of the one end cap. For example, an oven-cured adhesive may be used to attach the end caps. It can be difficult to achieve consistent heat transfer to both media ends for proper curing in a dual-element design; and in some cases the different media configurations and structures can require different curing temperatures, which can be problematic to accomplish with a single, integral structure.

As should be appreciated, the above issues can lead to undesirable manufacturing inconsistencies between elements, and otherwise require time-consuming and complicated manufacturing steps.

As such, it is believed there is a demand in the industry for a further improved filter element that not only prevents improper elements form being installed on a filter head, but which also removes water in the fuel as the fuel passes through the element. And more importantly, it is believed there is a demand in the industry for such a filter element which is simple and straightforward to manufacture and assemble on a consistent and repeatable basis.

SUMMARY OF THE PRESENT INVENTION

The present invention provides a new and unique replaceable filter element which is attachable to a filter head. The filter element removes water and other impurities in fuel passing through the element, and also prevents improper filter elements from being installed on the filter head. The element is simple and straightforward to manufacture and assemble as it allows the different media rings within the element to move or "float" with respect to each other within the housing as the filter element is being assembled.

According to the present invention, the filter element includes a cylindrical, cup-shaped housing enclosing a filter media assembly. The filter media assembly includes an outer, primary media ring designed primarily to remove particulate matter from a fluid stream; and an inner, secondary media ring designed primarily to remove water from the fluid stream. The media rings are located in co-axial relation with one another, with the outer media ring surrounding and being radially-outwardly spaced from the inner media ring. Upper and lower end caps are attached to the respective ends of the outer media ring. A seal is provided between the lower end cap of the outer media ring and the inside surface of the housing to seal the outer media ring to the housing and prevent fluid bypass.

An end cap assembly is further provided at the upper end of the element and includes an annular end cap piece attached to an upper end of the inner media ring. A second seal is provided between the upper end cap of the inner media ring, and the upper end cap of the outer media ring to prevent fluid bypass between these components. The end cap assembly also includes an annular flat plate, and a threaded flange portion, all of which can be formed unitary (in one piece) with one another. The annular flange portion bounds the periphery of the plate, and projects axially upward therefrom. The end cap assembly, and hence the inner media ring, is secured within the housing by forming an open end of the housing around the distal outer end of the threaded flange portion. Passages are formed either in the plate, or at or near the junction between the plate and the threaded flange portion, to allow the fuel to pass outward into a peripheral cavity surrounding the filter media assembly; that is, between the outer media ring and the inside surface of the housing.

When the inner and outer media rings are located within the housing, the outer ring can move or "float" into an appropriate sealing relationship with the housing. The inner media ring also moves and "floats" with respect to the outer media ring as the housing is formed over the outer flange. The seals between the outer and inner media rings and between the outer media ring and the housing provide the appropriate sealing relationship between these components to prevent fluid by-pass. The element described above is therefore relatively easy and straightforward to assemble, in a consistent and repeatable manner.

The upper end cap of the inner filter media has an annular body portion bonded to the end of the inner media ring, and an annular end cap wall which bounds the inner diameter of the annular body portion, and projects axially inward (downward) therefrom. A central disc-shaped portion, with fluid passages therethrough, transversely spans the annular end cap wall. An actuating projection extends axially upward from the central portion. The annular end cap wall portion of the end cap accepts a nipple portion of the filter head when the element is attached to the filter head.

Attachment of the element to the filter head causes the actuating projection to move a valve element in the head to an open position. This opens a flow path from the filter element to the outlet in the filter head. Disengagement of the element causes the valve element to move to the closed position and prevent flow through the head. As a result, only a proper filter element will operate in conjunction with the filter head; and conversely, the filter head will not operate without a filter element attached.

Further features and advantages will be apparent upon reviewing the following Detailed Description of the Preferred Embodiment and the appended Drawings.

DETAILED DESCRIPTION OF THE PREFERRED EMBODIMENT

Figure 1:
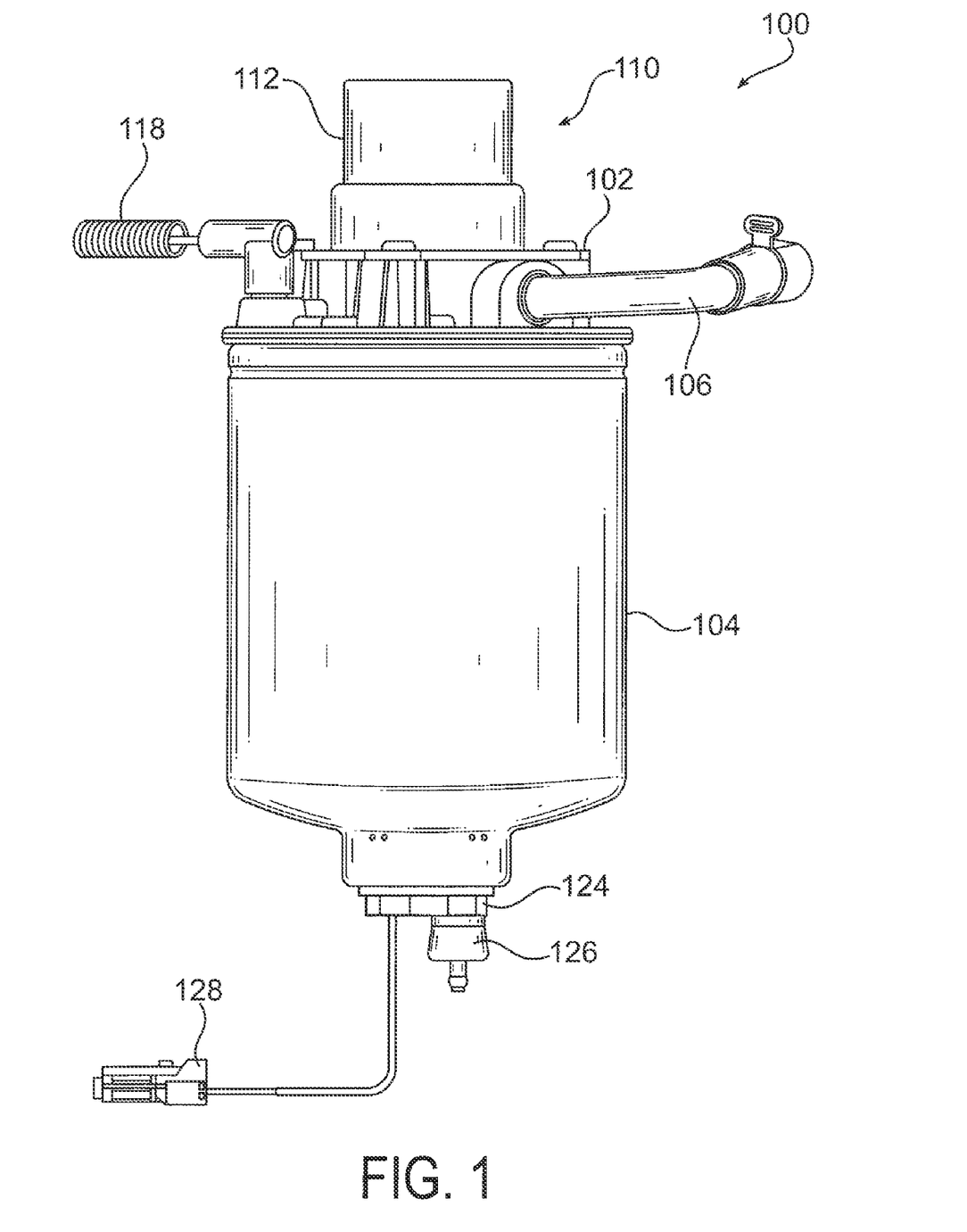
FIG. 1 is a front view of the filter element constructed according to an embodiment of the present invention, shown attached to a filter head.
Figure 2:
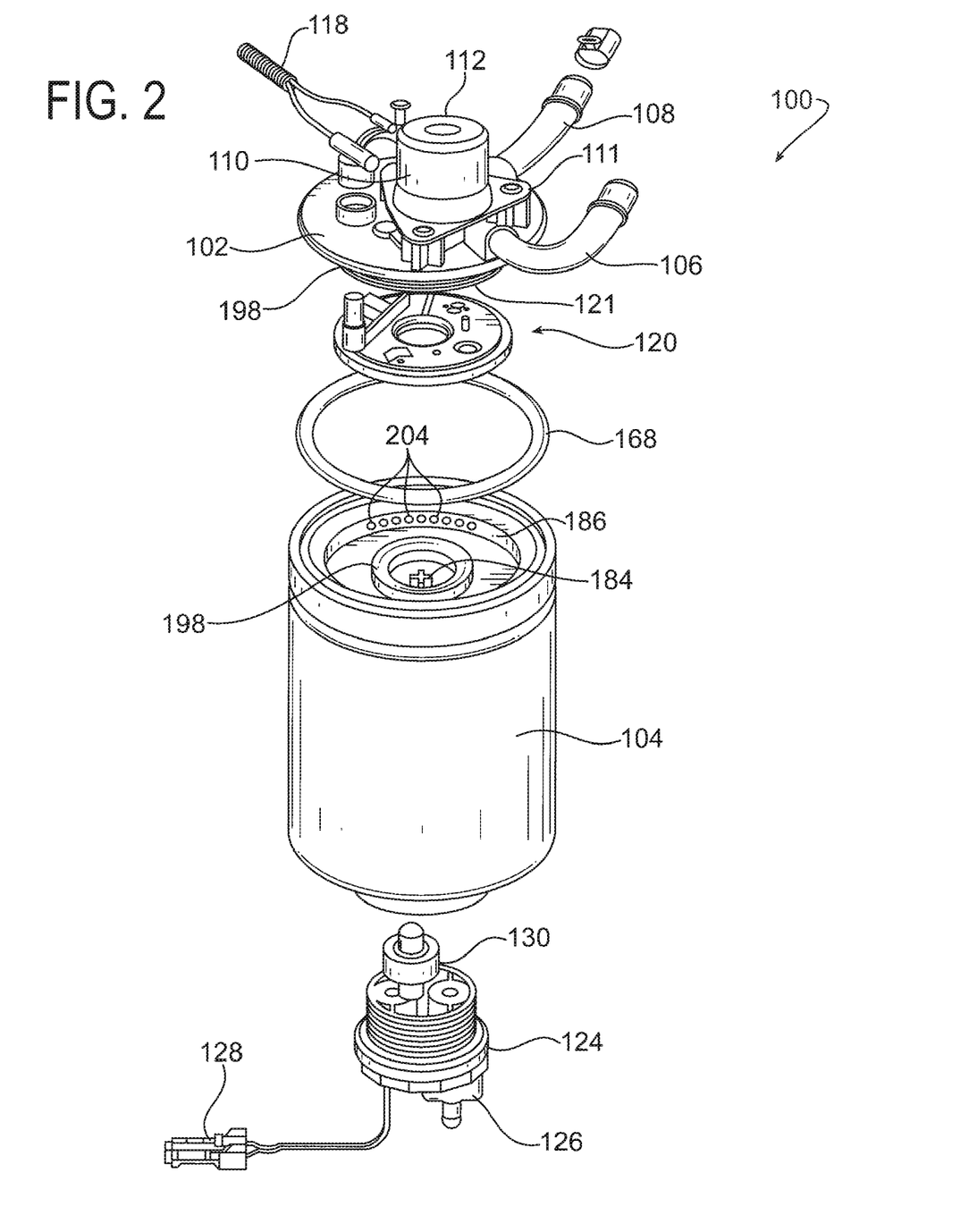
FIG. 2 is a partially assembled view of the filter element and filter head.

Referring initially to FIGS. 1 and 2, a filter assembly is indicated generally at 100. Filter assembly 100 includes a filter head 102 and a detachable filter element 104. The head includes an inlet 106 and an outlet 108, and a priming pump, indicated generally at 110, which includes a body 111 and a movable plastic, cup-shaped pump cap 112. Operation of the priming pump, for example, to prime the filter before an engine is started, by alternatingly depressing and releasing the pump cap, draws fluid into the inlet 106 and forces the fluid into the filter element 104. If appropriate, the head 102 can also include an electrical connector 118 for connection to a heater, indicated generally at 120, inside the head. The heater can be turned on during cold starts to heat the fuel entering the filter to prevent waxy deposits in the cold fuel from clogging the media. An annular flange 121 with threads on its outer periphery, is formed integrally with, and projects outwardly (downwardly) from the underside of the filter head 102. Filter element 104 screws onto and off of flange 121 as will be described below.

Further discussion about the filter head and its operation can be found in U.S. Pat. Nos. 5,643,446 and 6,328,883, which are incorporated herein by reference. Filter assembly 100 is particularly adapted for use within a fuel system in a vehicle; however it should be appreciated that it could be appropriate for other applications and fluids.

Figure 3:
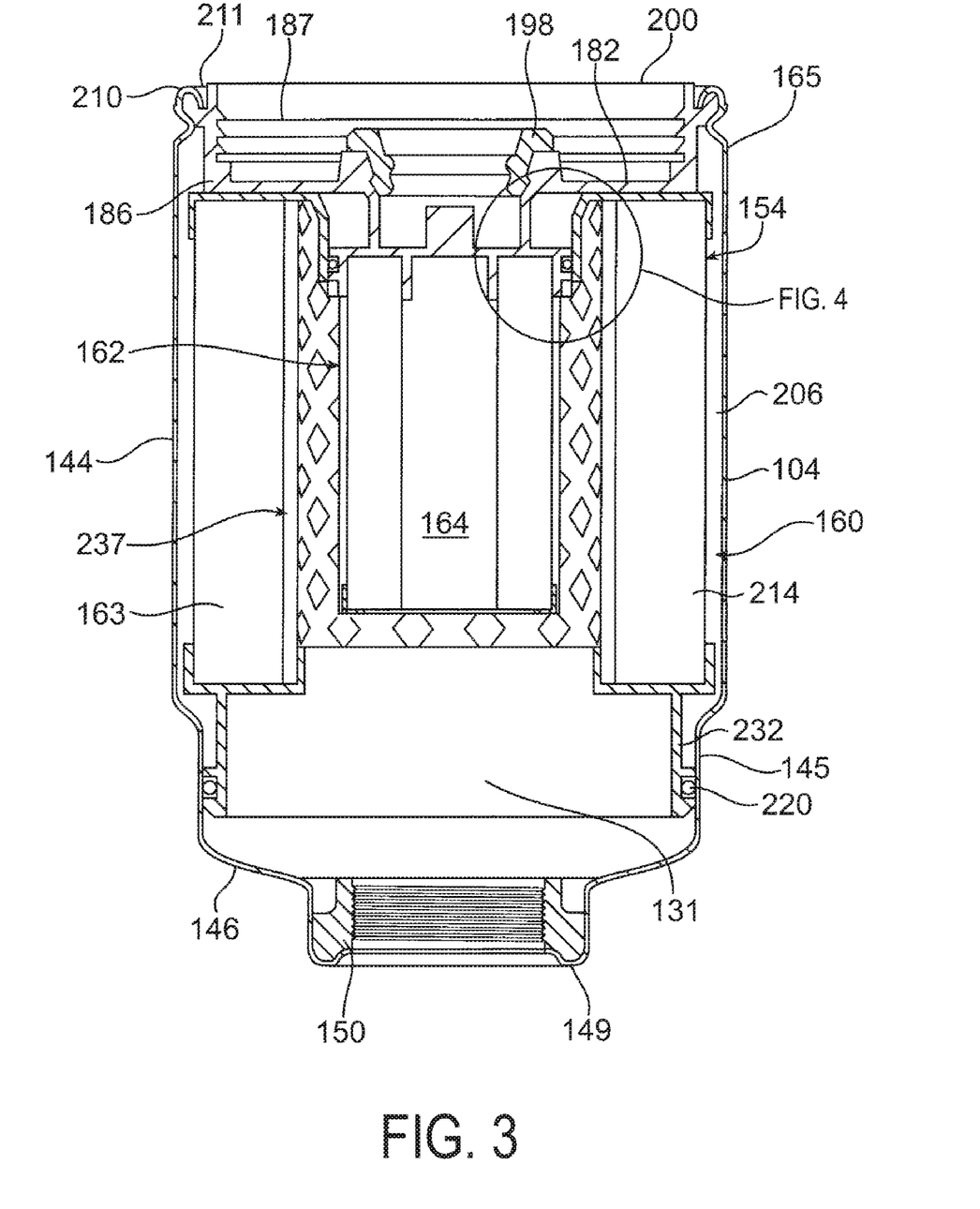
FIG. 3 is a cross-sectional side view of the filter element of FIG. 1.

Element 104 has a removable bottom cap 124, a drain valve 126 and an electrical connector 128 connectable to a water sensor (not shown) extending from bottom cap 124 to sense and allow drainage of water collecting in collection chamber 131 (FIG. 3).

Figure 5:
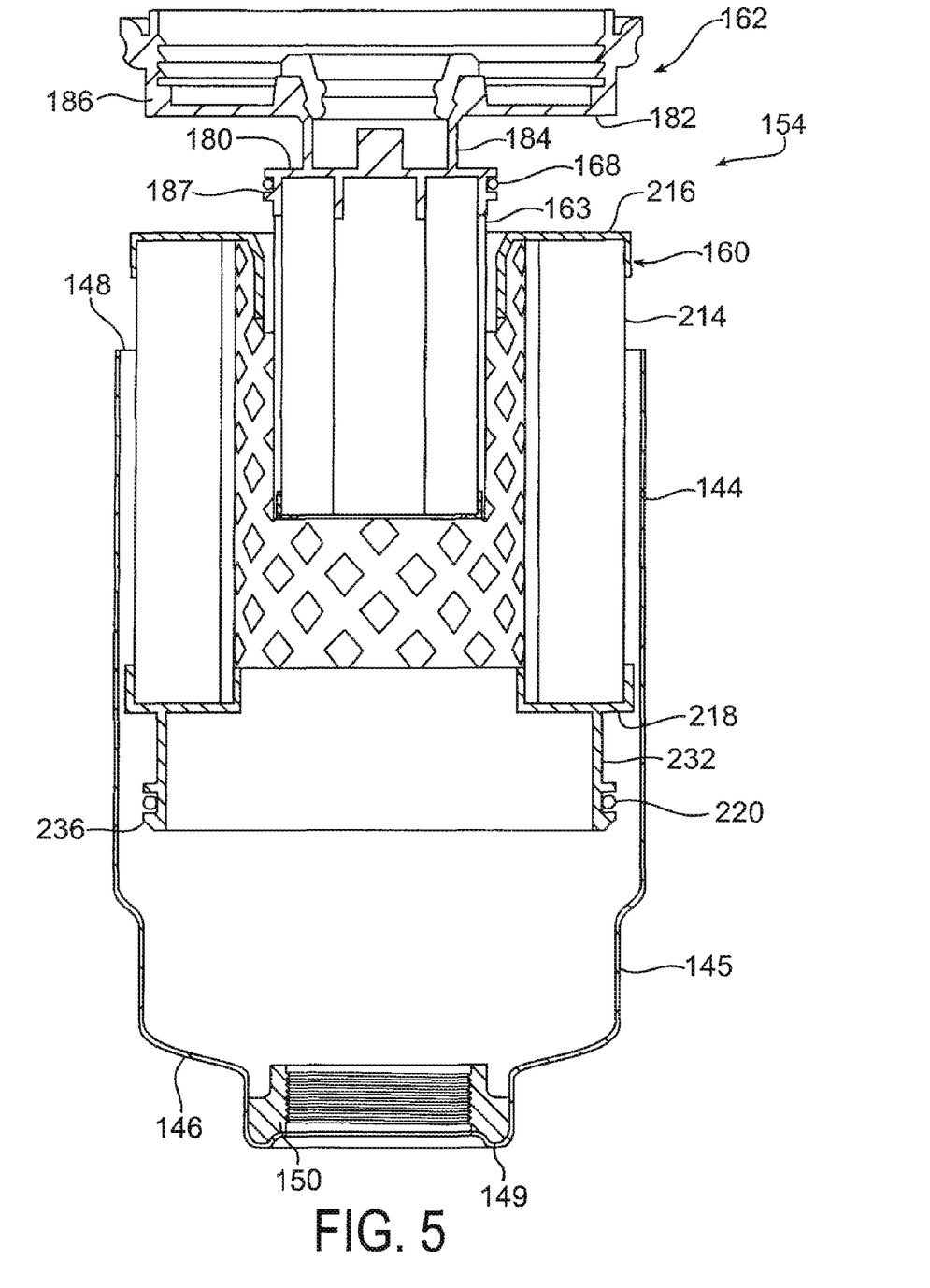
FIG. 5 is a cross sectional side view of the filter element of FIG. 3, shown partially disassembled.

Referring now to FIGS. 3 and 5, filter element 104 includes an outer, cup-shaped cylindrical canister or housing 144 formed from metal or other appropriate material, which tapers down to a reduced-diameter portion 145, and has an integral (preferably unitary) turned-in lower end wall 146, and an open upper end 148. Lower end wall 146 includes a central circular opening 149, and a ring-shaped plastic member 150 is supported in opening 149. Plastic member 150 has internal threads to receive removable bottom cap 124 (FIG. 2). Lower end wall 146 can be crimped or otherwise formed around ring-shaped member 150 to retain the ring-shaped member on the housing 144.

A filter media assembly, indicated generally at 154, is received and supported within canister 144. Filter media assembly 154 includes an outer, primary media ring subassembly 160 designed to initially remove particulate matter from a fluid stream, and an inner, secondary media ring subassembly 162 designed to subsequently remove water from the fluid stream.

Figure 6:
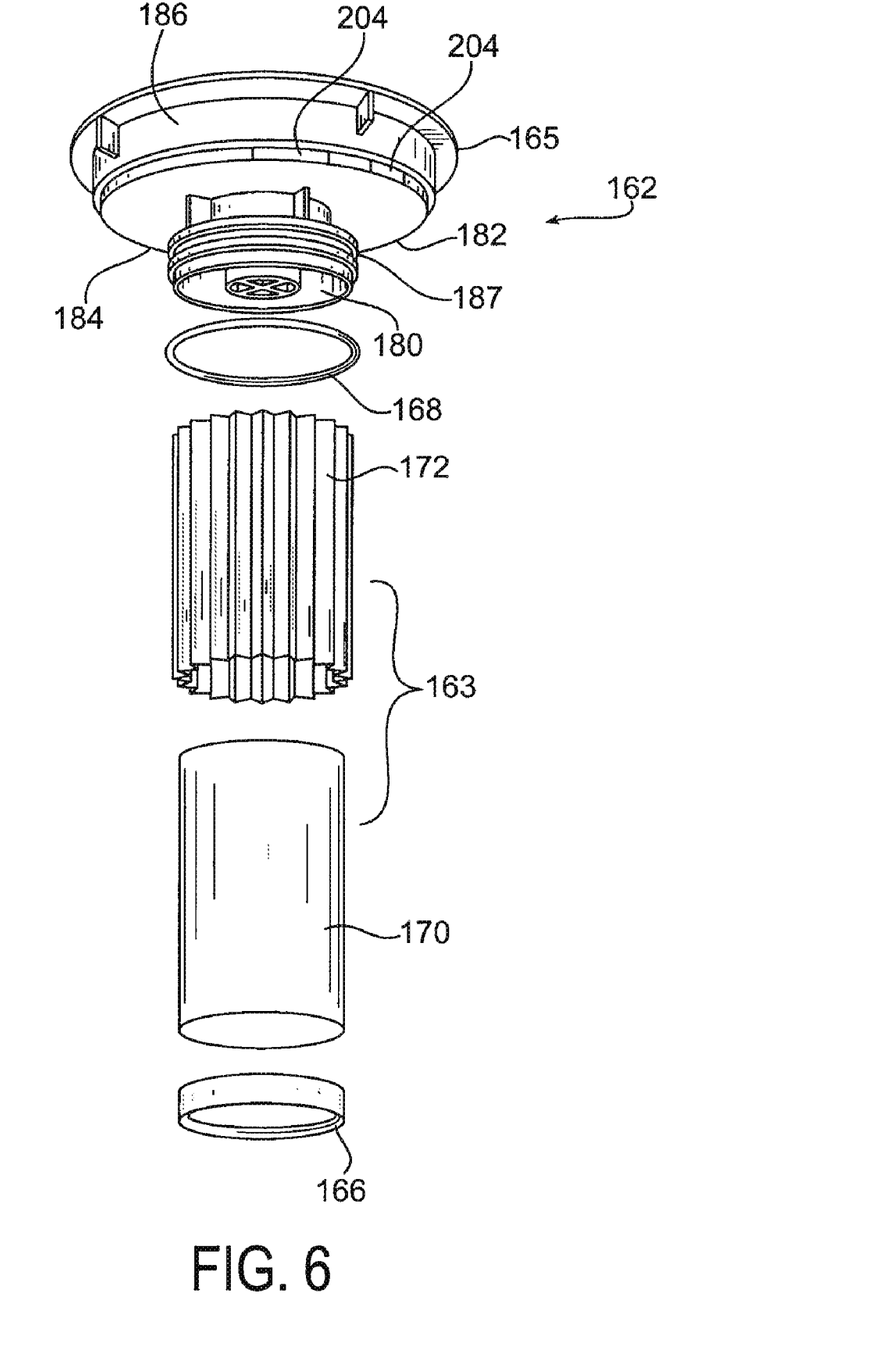
FIG. 6 is a perspective view of the inner media ring subassembly for the filter element, with some components shown in an exploded view.
Figure 7:
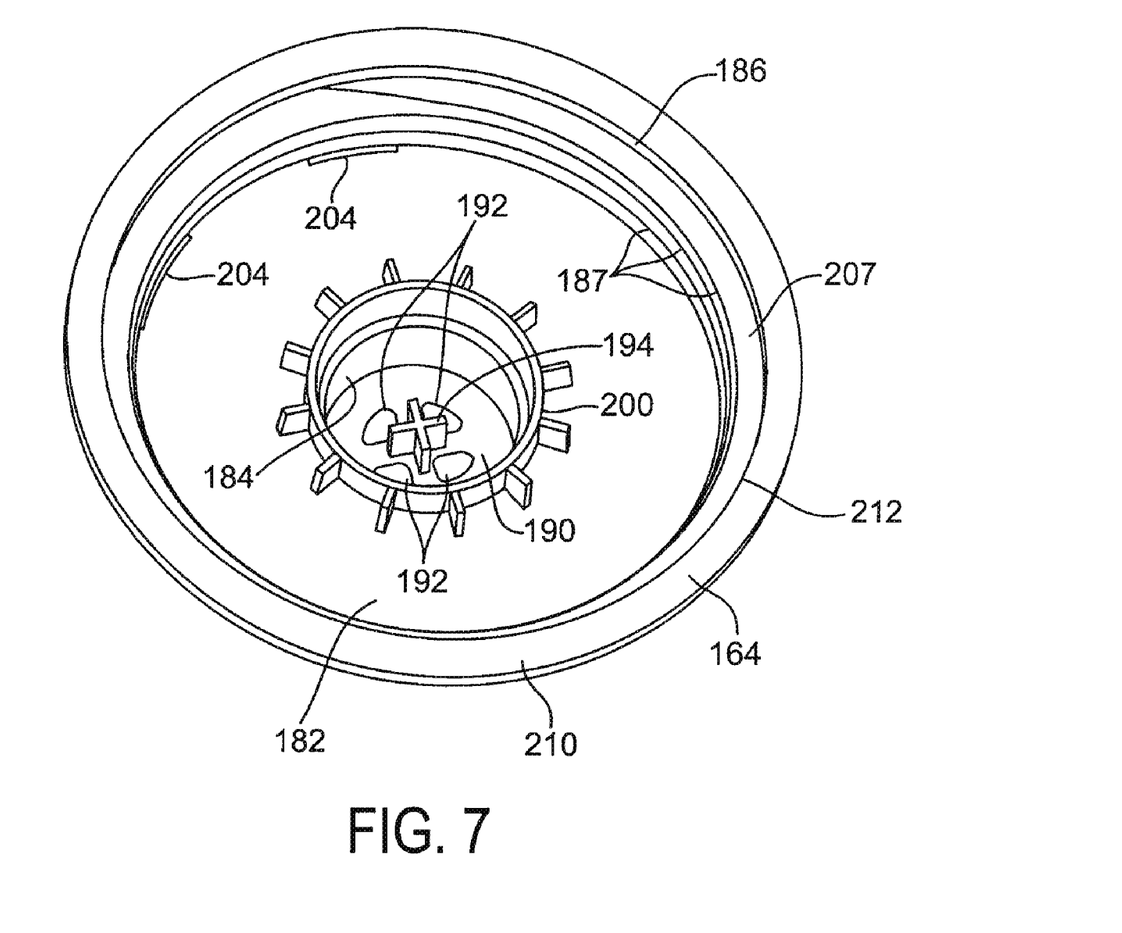
FIG. 7 is an elevated perspective view of the inner ring subassembly for the filter element.

The inner subassembly 162, as shown also in FIGS. 6 and 7, includes an inner media ring 163 circumscribing a central longitudinal axis and defining a central cavity 164, an end cap assembly 165 attached to an upper end of the inner media ring 163, a circular end cap 166 attached at an opposite, lower end of the media ring, and an annular resilient end cap seal or gasket 168. Inner media ring 163 is preferably a multi-layered media that can remove water from a fluid stream passing through the media, and also, as a secondary function, has particle separation capabilities. In one embodiment, the media ring comprises a first, outer media wrap 170 comprising a barrier medium of a hydrophobic material such as polyester screen or spun-bonded synthetic, or other comparable material which substantially prevents water from passing through the media ring; and a second, inner pleated media 172 comprising a final filter medium of a meltblown/cellulose composite, or comparable high efficiency filter material. While a particular form of the inner media ring is shown and described, the material and structure of the inner media ring can vary depending upon the particular application.

Figure 4:
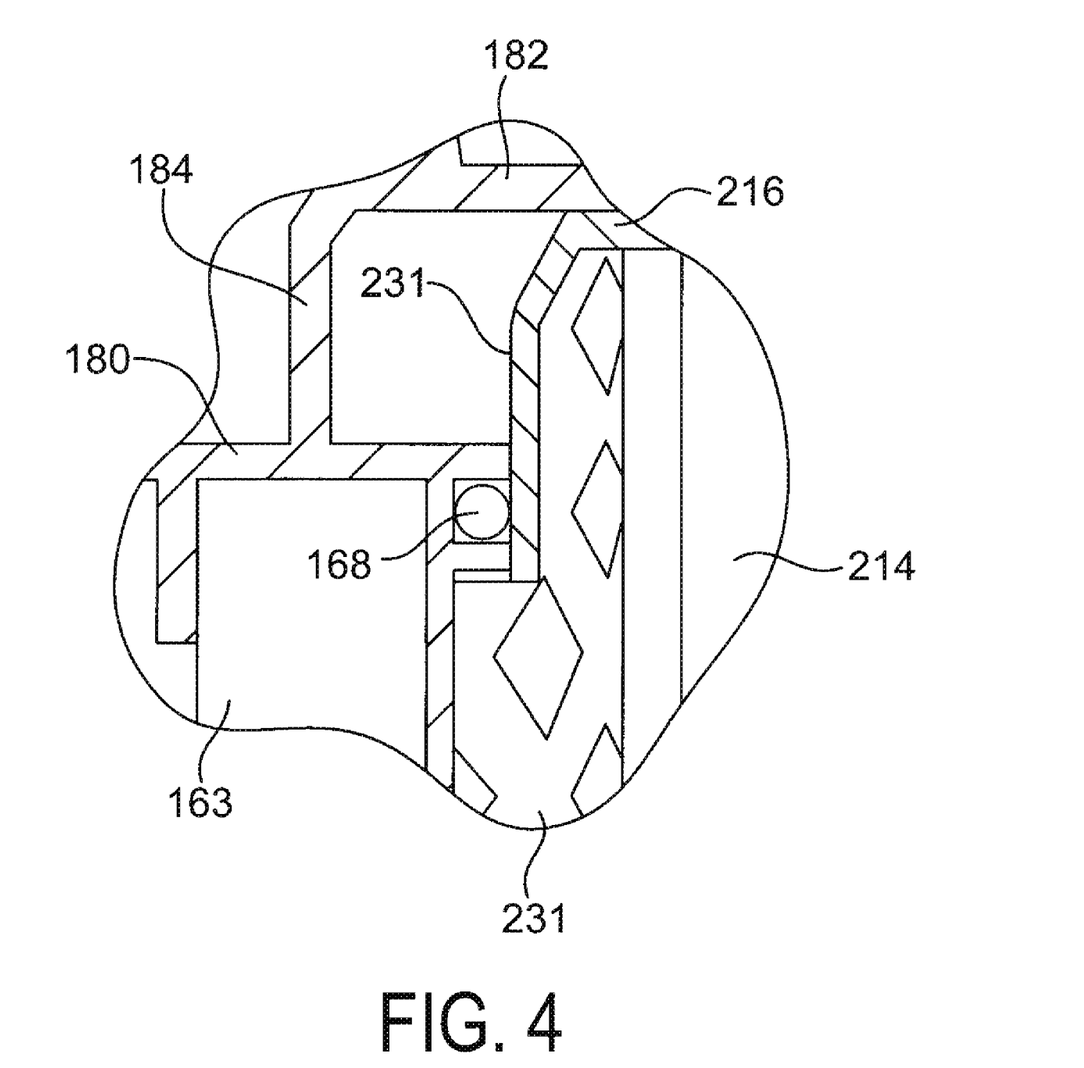
FIG. 4 is an enlarged, cross-sectional side view of a portion of the filter element of FIG. 3.

As also shown in FIG. 4, end cap assembly 165, also conventionally referred to as a tap plate assembly, includes an annular, flat end cap piece 180 sealingly bonded directly to an upper end of the inner media ring such as with appropriate adhesive or by other means; an annular flat plate 182 connected via a short annular wall or flange 184 to the upper/outer surface of the end cap piece 180; and a threaded annular flange portion 186. Annular flange portion 186 is located toward the periphery of the plate 182, and preferably outwardly bounds the plate. Annular flange 186 includes inwardly directed threads, as at 187, which cooperate with the outwardly directed threads of annular head flange 121 (FIG. 2), to removeably attach the filter element to the filter head. End cap seal 168 is received in a radially-outward projecting channel or groove 187 formed around the periphery of end cap piece 180. End cap piece 180, flat plate 182, flange 184 and flange portion 186 can be formed unitary (in one piece) with one another from an appropriate material such as plastic; or alternatively formed separately and then affixed in some manner such as with adhesive. Moreover, while a separate seal 168 is shown, this seal may be formed integral with end cap piece 180, such as a unitary radial lip seal.

Referring now to FIG. 7, annular end wall 184 inwardly bounds the central opening in end cap piece 180, and projects axially inward (downward) therefrom. A central disc-shaped portion 190 with fluid passages as at 192, transversely spans the annular wall 184. An actuating projection 194 extends axially upward from the central portion 190 and has a base end which is preferably formed unitary with the central portion. The annular wall portion of the end cap accepts the nipple portion of the filter head when the element is attached to the filter head, with the upper/outward free end of the actuating projection engaging a spherical valve member supported within the nipple portion. An annular head seal 198 (FIG. 3) is supported on a short flange 200 projecting axially outward (upward) from the plate 182, and inwardly bounds the central opening in the plate, for sealing against the nipple portion.

Passages as at 204 are formed either in the plate 182, or at or near the junction between the plate 182 and the threaded flange portion 186, to allow the fuel to pass outward into a peripheral cavity 206 (FIG. 3) surrounding the filter media assembly, that is, between the outer media ring subassembly 160 and the inside surface of the housing 104. The number and dimension of the fluid passages can be determined based upon the flow requirements for the particular application. Flange portion 186 includes an annular branch portion 210 projecting at an angle radially outward from the threaded portion, and which is configured such that the open end of the housing can be formed around the branch portion (as can be readily seen in FIG. 3). The open end 148 of the housing is formed (e.g., mechanically bent such as by roll-forming) around the radially-outer branch 210 at the upper end of flange 186, to secure the inner end cap assembly 162 to the housing. The flange 186 also includes a radially inner branch 211 which together with outer branch 210, defines an annular channel 212 opening outwardly from the end of the filter element. Annular 0-ring 168 (FIG. 2) is located in the channel, and provides a seal between the filter element 104 and the filter head 102 when the two parts are assembled together.

Circular end cap 166 at the opposite, lower end of the media ring is formed from a thin metal sheet, or other appropriate material such as plastic, and encloses the lower end of the inner media ring.

Figure 8:
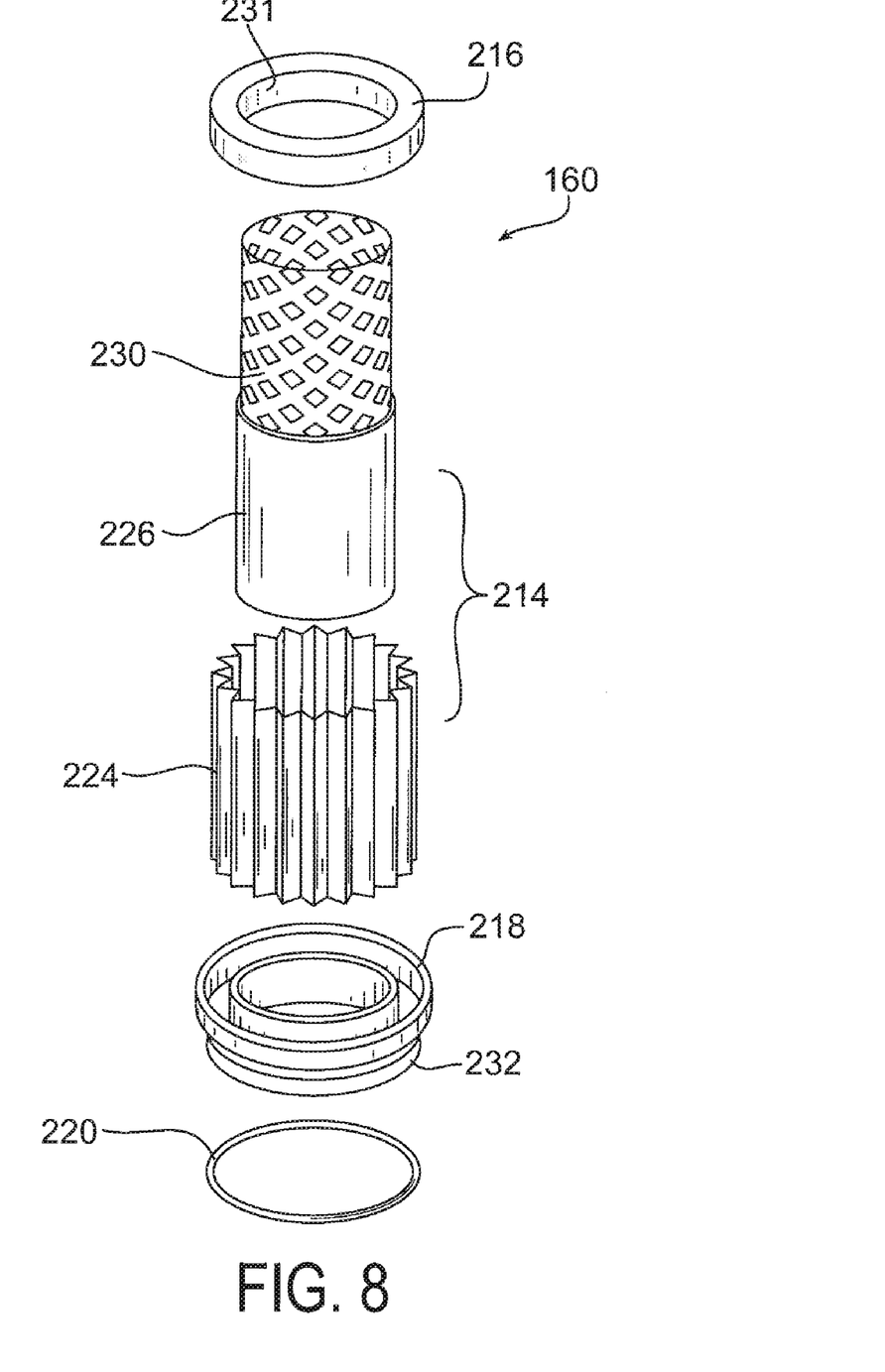
FIG. 8 is a perspective view of the outer media ring subassembly for the filter element, with some components shown in an exploded view.

The outer media ring subassembly 160, as shown in FIG. 8, includes an outer media ring 214; an upper annular end cap 216 sealingly bonded directly to an upper end of the outer media ring 214; a lower annular end cap 218 attached to an opposite, lower end of the media ring 214; and an annular resilient housing seal or gasket 220 carried by the lower end cap 218. Outer media ring 160 is preferably a multi-layered media that can remove particles from a fluid stream passing through the media. In one embodiment, the outer media ring comprises i) a first, outer media pleat 224 comprising a multi-layered medium of an outer prefilter of a polyester meltblown/cellulose, or other comparable material, and an inner coalescing medium of a microglass or meltblown, or other comparable material; and ii) a second, inner media wrap 226 comprising a polyester or glass release medium, or other comparable material, for releasing large water droplets. The material and structure of the outer media ring can also vary depending upon the particular application. The outer media pleat 224 and inner media wrap 226 are received and supported on a metal or plastic perforated support core 230. Water generally coalesces into large droplets on the inside surface of the outer media ring where it collects and drips down into the lower collection area 131.

The upper end cap 216 for the outer media ring includes an annular skirt 231 with a smooth, radially inward directed sealing surface, inwardly bounding the end cap and extending a short distance axially inwardly from the upper end cap toward the lower end cap. The upper end cap 216 is formed from plastic or other appropriate material, for example in one piece.

The lower end cap 218 for the outer media ring includes an axially downward extending annular flange 232, which includes a radially-outward directed channel 236 toward its distal end which receives and carries seal 220 (see, e.g., FIG. 5). The lower end cap 218 is likewise formed in a single piece from plastic or other appropriate material.

Referring again to FIGS. 3-5, the media ring subassemblies 160, 162, are located in co-axial relation with one another, with the outer media ring subassembly 160 substantially surrounding the inner media ring subassembly 162. An intermediate annular chamber 237 is defined between the inner and outer media rings 163 and 214. The inner media ring is first assembled with the outer media ring, and the rings are then located within the housing. Annular flange 232 of the outer media ring fits closely within the reduced-diameter portion 145 of the housing, with seal housing 220 providing a seal between the end cap and an inner surface of the housing. The outer media ring subassembly can "float" within the housing as it is assembled until it finds an appropriate orientation, which is generally completely or at least substantially aligned with the vertical axis of the housing.

The inner media ring subassembly can likewise "float" within the housing relative to the outer ring subassembly until it too, finds its appropriate orientation. As can be seen particularly in FIG. 4, the end cap piece 180 of the inner end cap subassembly is closely received within the skirt 231 of the upper end cap 216 from the outer end cap subassembly, with end cap seal 168 on the upper end cap subassembly 165 providing a fluid seal between the inner media ring subassembly and the inner radial sealing surface of the skirt of the outer media ring subassembly to prevent fluid bypass therebetween. As should be appreciated, as an alternative, seal 168 could likewise be supported and carried by skirt 231 of the end cap 216—and seal against a smooth surface on the outer diameter of the end cap 180 of the inner ring subassembly. Such an alternative would achieve the same result—allowing the inner and outer filter rings subassemblies to float with respect to one another while still preventing fluid bypass therebetween.

Appropriate stand-offs or radial ribs can be provided around the periphery of the end cap 216 of the outer media ring subassembly, to facilitate locating the outer filter ring subassembly in the housing and providing flow paths into the peripheral cavity 206. as described above, the upper end 148 of the housing is formed around the outer branch 210 of the threaded flange 186 to lock the end cap assembly, and hence the inner media ring subassembly, in the filter element. As the proper orientation of the threaded flange on the end cap assembly and the housing is important for the roll-forming process; and likewise, the proper orientation of the end cap assembly and the housing is important for a proper seal between the head and element, the assembly of these elements can be accomplished without being effected by the relative orientation of the outer media ring subassembly within the element. In other words, the outer media ring subassembly can find its own orientation within the housing and not otherwise disrupt the proper assembly of the element. Again, both the inner and outer media rings still have the appropriate fluid seals between each other and with the housing to prevent fluid by-pass of the filter element.

Referring again to FIGS. 1-3, after assembly of the element, the threaded portion 186 of the element engages the threaded portion of flange 121 in the filter head 102 to securely hold the element to the head. When the element is engaged to the head, the free end of actuating projection 184 is positioned to engage the valve element in the head to enable fluid to flow from the element into the head. Fluid to be filtered is introduced through inlet 106 into the filter head, and is directed into the area bounded by the head seal 198 and the outer annular flange 186 of the end cap assembly, where the flow passes through openings 204 into peripheral cavity 206. The fluid to be filtered then passes radially inwardly through outer media ring 214, where particulate matter is removed. The flow then continues passing into intermediate chamber 237 and radially inward through inner media ring 163 into the central cavity 164 of the inner media ring. Water in the fluid collects on the outside surface of the inner media ring, and agglomerates and drips downward into the collection area 131, where it can be periodically removed through drain 126. The filtered and substantially water-free fluid then passes upwardly through the passages 192 (FIG. 7) formed in central portion 190 of the end cap piece 180. The flow then passes upwardly into the filter head 102 and out through the outlet 108.

Thus, as described above, the present invention provides a new and unique replaceable filter element which is attachable to a filter head. The filter element removes water and other impurities in fuel passing through the element, and also prevents improper filter elements from being installed on the filter head. The element is simple and straightforward to manufacture and assemble as it allows the different media rings within the element to move or "float" with respect to each other within the housing as the filter element is being assembled.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A filter, comprising:
    an inner ring-shaped hydrophobic filter media circumscribing a central axis and having first and second ends, and an outer ring-shaped particle filter media, also having first and second ends, circumscribing the first ring and defining an annular gap between the first and second media rings;
    a housing receiving said inner and outer filter media rings, said housing including a first open end and a second end, the first end of the filter media rings being located toward the first open end of the housing, and the second end of the filter media rings being located toward the second end of the housing;
    an end cap assembly at the first end of the inner media ring, the end cap assembly including an annular end cap piece sealingly connected to the first end of the inner media ring and an annular plate connected to the annular end cap piece and defining a central opening, and an annular flange connected to the annular plate and extending axially outward away from the annular plate, said annular flange including a threaded portion to enable the filter element to be removeably connected to a corresponding threaded portion of a filter head, the end cap assembly of the inner media ring enclosing the open end of the housing with the open end of the housing being secured to the annular flange of the end cap assembly;
    a resilient annular head seal bounding the central opening in the annular plate;
    first flow openings in the end cap assembly to enable fluid flow through the end cap assembly, and a central support portion spanning the annular body and having second flow openings, separate from the first flow openings, to enable flow through the central opening in the plate, said central support portion supporting an axial projection, said projection extending in an axially outward direction from a base end located interiorly of the media, to a distal end;
    a first end cap at the first end of the outer media ring, the first end cap including an annular body portion sealingly connected to the first end of the outer media ring, and a second end cap at the second end of the outer media ring, and a resilient housing seal supported by the second end cap of the outer media ring, the housing having an inner surface with the resilient housing seal providing a seal between the second media ring and the inner surface of the housing; and a resilient annular end cap seal supported by and providing a seal between the end cap assembly of the inner media ring, and the first end cap of the outer media ring.

2. The filter as in claim 1, where the end cap seal is supported within a channel on the periphery of the annular end cap piece of the end cap assembly.

3. The filter as in claim 2, wherein the first end cap of the outer media ring includes an annular skirt circumscribing the inner diameter of the annular body portion of the outer media ring, and extending toward the second end cap, the skirt having a radially inward directed sealing surface, and the end cap seal is located in sealing relation with the sealing surface.

4. The filter as in claim 1, wherein the second end cap of the outer media ring includes an annular flange projecting axially away from the annular body portion of the second end cap, and the resilient housing seal is supported within a channel around the periphery of the annular flange of the second end cap.

5. The filter as in claim 1, wherein the annular end cap piece of the end cap assembly is sealingly bonded directly to the first end of the inner media ring.

6. The filter as in claim 1, wherein the annular body portion of the first end cap of the outer media ring is sealingly bonded directly to the first end of the outer media ring.

7. The filter as in claim 1, wherein the annular plate of the end cap assembly is axially spaced from the first end cap of the outer media ring, and a flow gap is defined between the base and the first end cap of the outer media ring.

8. The filter as in claim 1, wherein the annular flange of the end cap assembly is located toward the periphery of the annular plate.

9. A filter, comprising:
 a filter canister with a first, open end, and a second end, and circumscribing a central axis;
 a first filter subassembly located within the canister and a peripheral annular chamber defined between the first filter subassembly and the canister, the first filter subassembly including i) a ring-shaped filter media; ii) a first annular end cap sealingly bonded at one end of the media ring and having a radial sealing surface; ii) a second end cap sealingly bonded at another end of the media ring; and iv) a resilient can seal carried by the second end cap and providing a seal between the second end cap and the filter canister;
 a second filter subassembly located centrally within the first filter subassembly and circumscribing a central cavity, and an intermediate annular chamber defined between the second filter subassembly and the first filter subassembly, the second filter subassembly including i) a second ring-shaped filter media; ii) an end cap assembly at the open end of the filter canister sealingly bonded to one end of the second media ring and including a central opening into the central chamber of the second media ring, and at least one other opening spaced apart from the central opening into the peripheral chamber; iii) an end cap enclosing another end of the second filter media ring; and iv) a resilient annular end cap seal between the first annular end cap of the first filter subassembly and the end cap assembly of the second filter element; and
 a flow path defined through the at least one other opening and into the peripheral chamber, radially through the first media ring and into the intermediate chamber, radially through the second filter media ring and through the central opening in the end cap assembly.

10. The filter as in claim 9, wherein the end cap assembly further includes i) a threaded annular flange; ii) an annular end cap piece sealingly bonded to the one end of the second media ring; and iii) an axial projection supported by the end cap assembly and located along the axis of the filter canister.

11. The filter as in claim 10, wherein the annular end cap seal is carried by the end cap assembly of the second filter element and is located to seal against the radial sealing surface on the first annular end cap of the first filter subassembly.

12. The filter as in claim 11, where the end cap seal is supported within a channel on the periphery of an annular end cap piece of the end cap assembly.

13. The filter as in claim 12, wherein the first end cap of the media ring of the first filter subassembly includes an annular skirt circumscribing the inner diameter of the first end cap, and extending toward the second end cap, the skirt having the radially inward directed sealing surface, and the end cap seal is located in sealing relation with the sealing surface.

14. The filter as in claim 13, wherein the second end cap of the outer media ring includes an annular flange projecting axially away from an annular body portion of the second end cap, and the resilient can seal is supported within a channel around the periphery of the second end cap.

* * * * *